United States Patent
Leung

(10) Patent No.: US 6,621,810 B1
(45) Date of Patent: Sep. 16, 2003

(54) MOBILE IP INTRA-AGENT MOBILITY

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/322,118

(22) Filed: May 27, 1999

(51) Int. Cl.[7] .................................................. H04Q 7/24
(52) U.S. Cl. ....................................... 370/338; 370/351
(58) Field of Search ................................ 370/338, 349, 370/351, 400–401, 352–356, 389, 391, 392; 455/403, 432, 433, 435

(56) References Cited

U.S. PATENT DOCUMENTS

| | | | |
|---|---|---|---|
| 4,692,918 A | 9/1987 | Elliott et al. .................. | 370/85 |
| 5,016,244 A | 5/1991 | Massey et al. ................. | 370/16 |
| 5,018,133 A | 5/1991 | Tsukakoshi et al. ... | 340/825.05 |
| 5,218,600 A | 6/1993 | Schenkyr et al. ............. | 370/16 |
| 5,371,852 A | 12/1994 | Attanasio et al. ........... | 395/200 |
| 5,473,599 A | 12/1995 | Li et al. ........................ | 370/16 |
| 5,825,759 A * | 10/1998 | Liu ............................. | 370/331 |
| 6,160,804 A * | 12/2000 | Ahmed et al. .............. | 370/349 |
| 6,195,705 B1 * | 2/2001 | Leung ......................... | 709/245 |
| 6,215,779 B1 * | 4/2001 | Bender et al. .............. | 370/338 |
| 6,414,950 B1 * | 7/2002 | Rai et al. ..................... | 370/338 |
| 6,434,134 B1 * | 8/2002 | La Porta et al. ........... | 370/338 |

OTHER PUBLICATIONS

Release notes for 3Com Corporation, "Conducting a Redundant Route for Network Resiliency," Mar. 1994, *NET Builder Family Bridge/Router* pp. 26–29.

Uyless Black, "TCP/IP and Related Protocols," 1992, *McGraw–Hill, Inc.*, pp. 226–249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

Network Working Group, RFC 2002 "IP Mobility Support," Oct. 1996.

C. Perkins, "*IP Mobility Support*," RFC2002, IBM Corporation, Oct. 1996.

"*Mobile IP*," Release 12.0(1)T, pp. 1–55.

Montenegro, G., "*Reverse Tunneling for Mobile IP*," RFC 2344, Sun Microsystems, Inc., pp. 1–19, May 1998.

D. Harkins and D. Carrel, "*The Internet Key Exchange (IKE)*," Cisco Systems, pp. 1–33, Jun. 1998.

(List continued on next page.)

*Primary Examiner*—Ajit Patel
*Assistant Examiner*—Chirag Shah
(74) *Attorney, Agent, or Firm*—Beyer Weaver & Thomas LLP

(57) ABSTRACT

Methods and apparatus for enabling intra-agent mobility by a mobile node are disclosed, thereby permitting a mobile node to register with a Home Agent via a Foreign Agent where the Home Agent and the Foreign Agent are provided in the same router. A method of registering a mobile node visiting a Foreign Agent with a Home Agent includes receiving a registration request packet specifying a Home Address and a care-of address. It is then determined whether the Home Address specified in the registration request packet is equivalent to a Home Agent address associated with the router. In addition, it may be determined whether the care-of address specified in the registration request packet is equivalent to a Foreign Agent address advertised by the router. Alternatively, it may be determined whether the D bit specified in the registration request packet is set and the care-of address specified in the registration request packet is a collocated care-of address. The mobile node may then be registered with the Home Agent through the use of a physical interface on the router rather than creating or specifying a tunnel interface to reach the mobile node or the Home Agent.

31 Claims, 10 Drawing Sheets

OTHER PUBLICATIONS

D. Cong and M. Hamlen, and C. Perkins, "*The Definitions of Managed Objects for IP Mobility Support using SMIv2,*" RFC2006, Motorola and IBM, pp. 1–52, Oct. 1996.

World Wide Web, "*Cisco IOS Local–Area Mobility—A Cisco IOS Software Solution to Business Needs to Enable Mobility Within the Enterprise Network,*" White Pages, pp. 1–13, Posted Date, Apr. 12, 1999.

* cited by examiner

MOBILE IP INTRA-AGENT MOBILITY

BACKGROUND OF THE INVENTION

1. Field of the Invention

The present invention relates to Mobile IP network technology. More particularly, the present invention relates to Mobile IP intra-agent mobility.

2. Description of the Related Art

Mobile IP is a protocol which allows laptop computers or other mobile computer units (referred to as "Mobile Nodes" herein) to roam between various sub-networks at various locations—while maintaining Internet and/or WAN connectivity. Without Mobile IP or related protocol, a Mobile Node would be unable to stay connected while roaming through various sub-networks. This is because the IP address required for any node to communicate over the Internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the Internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the Internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the Internet through its designated Home Agent. When the Mobile Node roams, it communicates via the Internet through an available Foreign Agent. Presumably, there are many Foreign Agents available at geographically disparate locations to allow wide spread Internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the Internet 4 through Home Agent 8 (an appropriately configured router denoted R2). Note that Home Agent 8 need not directly connect to the Internet. For example, as shown in FIG. 1, it may be connected through another router (a router R1 in this case). Router R1 may, in turn, connect one or more other routers (e.g., a router R3) with the Internet.

Now, suppose that Mobile Node 6 is removed from its home base network segment 12 and roams to a remote network segment 14. Network segment 14 may include various other nodes such as a PC 16. The nodes on network segment 14 communicate with the Internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the Internet 4 and to corresponding node 18 (as indicated by the dotted line "packet from MN") according to a standard Internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the Internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As described above, a mobile node typically roams from its Home Agent on one router to a Foreign Agent on another router. While Mobile IP, specified in RFC 2002, permits mobile nodes to remain connected to the Internet while roaming to Foreign Agents on the Internet, such mobility is enabled through the use of two separate routers or other network devices. However, there are instances in which it may be desirable to move within a vicinity of a router (home agent) without roaming to a second router. By way of example, a laptop user connected to the Internet may wish to move to another location without ending an Internet session.

In view of the above, it would be desirable to enable a mobile node to move within a vicinity of a single router while sustaining an active Internet session.

SUMMARY OF THE INVENTION

The present invention enables intra-agent mobility by a mobile node. Intra-agent mobility is accomplished through registration with a Home Agent via a Foreign Agent where both the Home Agent and the Foreign Agent are provided in a single network device (e.g., router). By way of example, this may be accomplished through the use of a physical interface on the router, thereby eliminating the need to create or specify a tunnel interface to reach the mobile node or the Home Agent. Accordingly, memory requirements during registration and upon completion of the registration process are dramatically reduced. Moreover, since tunnels need not be created, the time required to complete the registration process is minimized.

According to one embodiment, the present invention enables inter-agent mobility as well as intra-agent mobility. Therefore, it is determined from the registration request packet received by the router whether intra-agent or inter-agent mobility is appropriate. In other words, it is determined whether the router includes the Home Agent of the mobile node sending the registration request packet as well as the Foreign Agent through which the mobile node is registering.

The router determines whether it includes the Home Agent with which the mobile node is registering. According to one aspect, a method of registering a mobile node with a Home Agent via a Foreign Agent is provided in a router supporting Mobile IP. A registration request packet specifying a Home Address and a care-of address is received. It is then ascertained whether the Home Address specified in the registration request packet is equivalent to a Home Agent address associated with the router. If it is determined that the Home Address specified in the registration request packet is not equivalent to a Home Agent address, the registration request packet is forwarded to another Home Agent associated with the mobile node.

In addition, the router determines whether it includes the Foreign Agent that the mobile node is visiting. This may be accomplished in several ways. According to one aspect, it is determined whether the care-of address specified in the registration request packet is equivalent to a Foreign Agent address associated with the router. For instance, it may be determined whether the care-of address specified in the registration request packet is advertised by the router as the Foreign Agent address associated with the router. If it is determined that the care-of address specified in the registration request packet is equivalent to a Foreign Agent address and the Home Address specified in the registration request is equivalent to a Home Agent address, the mobile node is registered with a Home Agent associated with the Home Agent address via a Foreign Agent associated with the Foreign Agent address.

According to another aspect, the router may include the Foreign Agent through which the mobile node is registering even where the care-of address is a collocated care-of address. Thus, it is determined whether the care-of address specified in the registration request packet is a collocated care-of address (e.g., an address on the network of the inbound interface of the router). In addition, it is determined whether the D bit in the registration request packet is set. If it is determined that the care-of address specified in the registration request packet is a collocated care-of address and the D bit in the registration request packet is set, the mobile node is registered with the router's Home Agent (i.e., associated with the Home Agent address) via the router's Foreign Agent.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

An invention is described herein which provides intra-agent mobility. Through providing a Foreign Agent and a Home Agent in a single router, a mobile node may roam to the Foreign Agent and register with the Home Agent. In this manner, the mobile node may move within a vicinity of the Home Agent without ending an Internet session.

Figure 1:
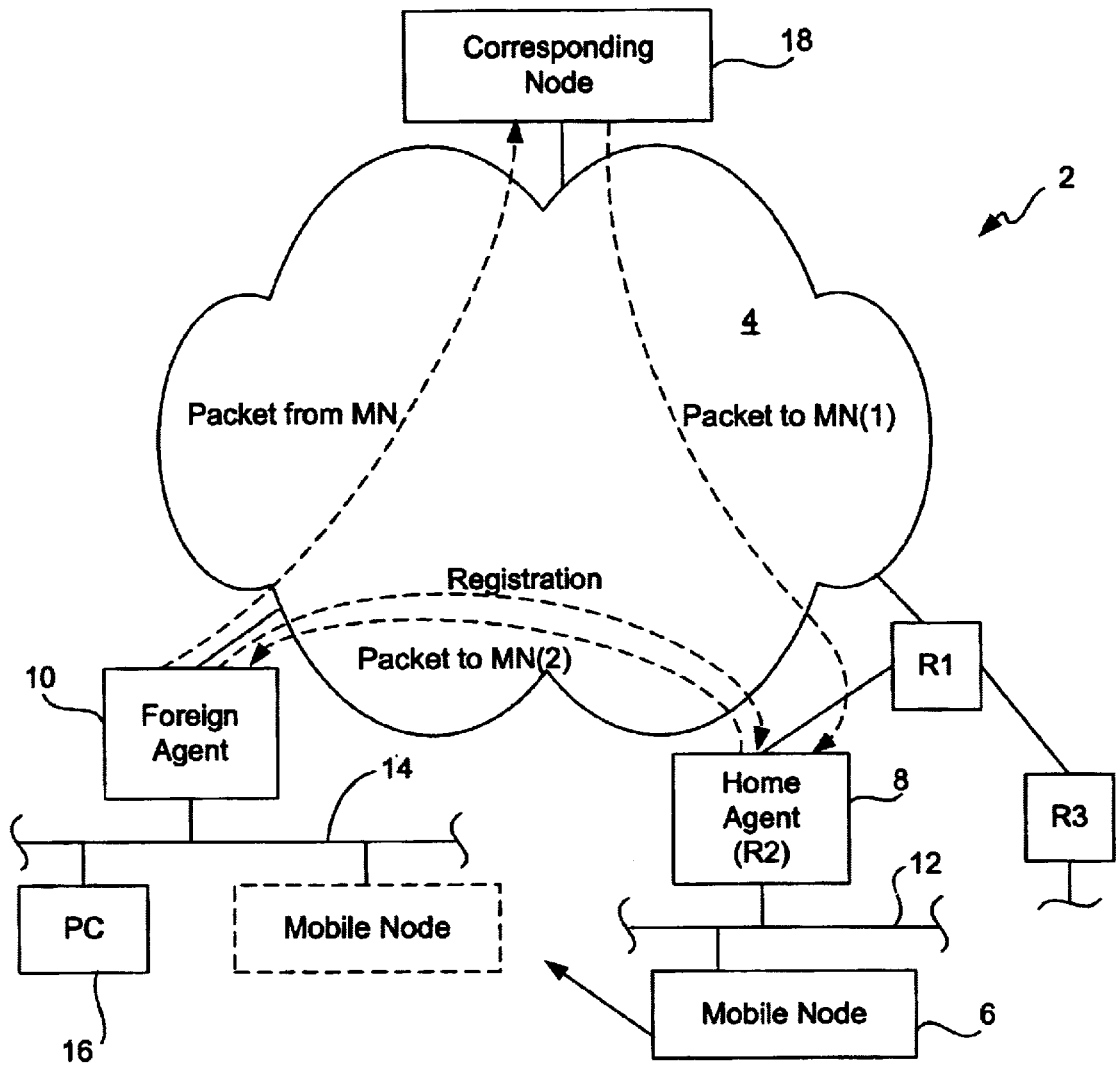
FIG. 1 is a diagram of a Mobile IP network segment and associated environment permitting inter-agent mobility.
Figure 2:
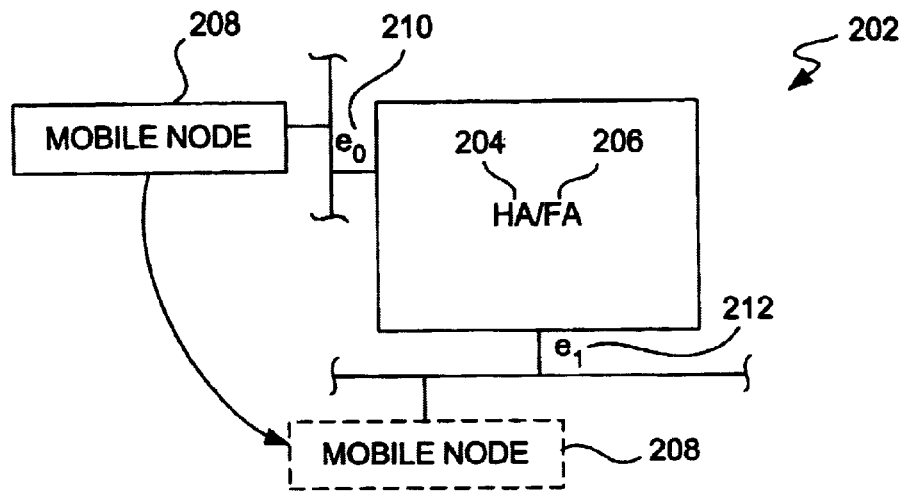
FIG. 2 is a diagram of a Mobile IP router that enables intra-agent mobility according to one embodiment of the invention.

As described above, the router of the present invention includes both a Home Agent and a Foreign Agent. FIG. 2 is a diagram illustrating a Mobile IP router that enables intra-agent mobility according to one embodiment of the invention. Although the router may include multiple Home Agents and Foreign Agents, the described embodiment includes a single Home Agent and a single Foreign Agent. As shown, the Mobile IP router 202 includes a Home Agent 204 and a Foreign Agent 206. The Home Agent 204 and the Foreign Agent 206 may be configured to provide service on any number of interfaces. Moreover, the interfaces of the Home Agent 204 and the Foreign Agent 206 may overlap. In other words, interfaces configured to provide service to the Home Agent 204 may also be configured to provide service to the Foreign Agent 206. By way of example, Home Agent service may be provided on one interface of the router while Foreign Agent service may be provided on another interface of the router 202. Thus, a mobile node 208 may roam from the Home Agent 204 to the Foreign Agent 206 as shown from a first interface of the router to a second interface of the router. Although two interfaces $e_0$ 210 and $e_1$ 212 are shown, the router may include a greater number of interfaces. A corresponding node may then communicate with the mobile node by continuing to send packets to the Home Agent 204. However, in order to enable such intra-agent mobility, the mobile node must successfully complete the registration process.

Figure 3:
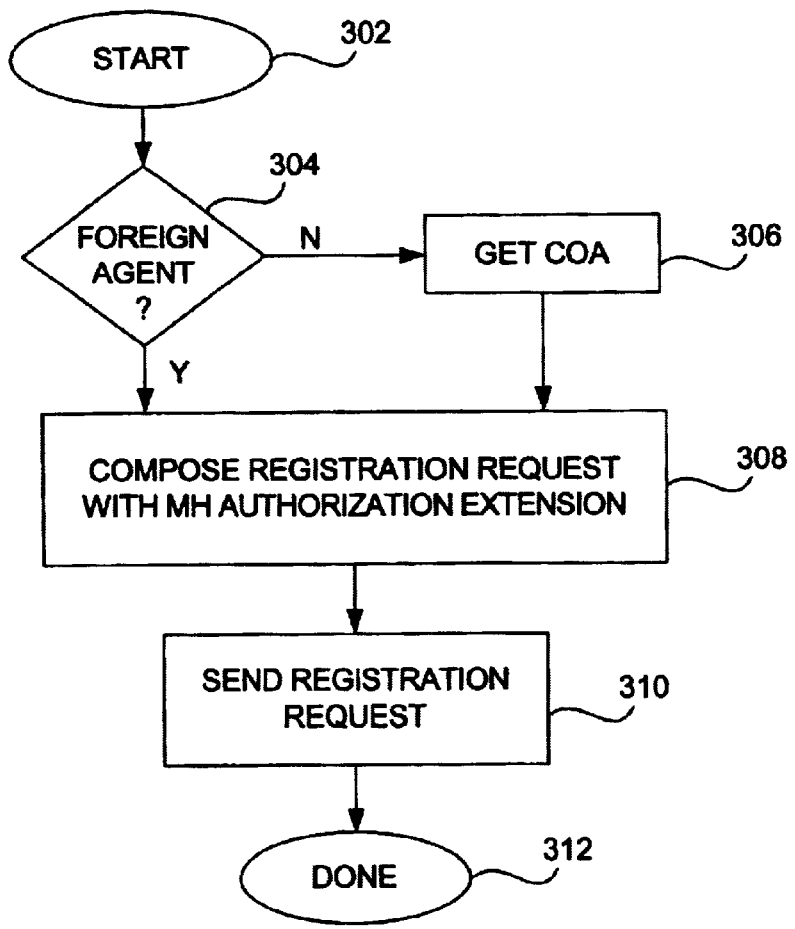
FIG. 3 is a process flow diagram illustrating the processes performed by a mobile node during registration according to an embodiment of the invention.
Figure 4A:
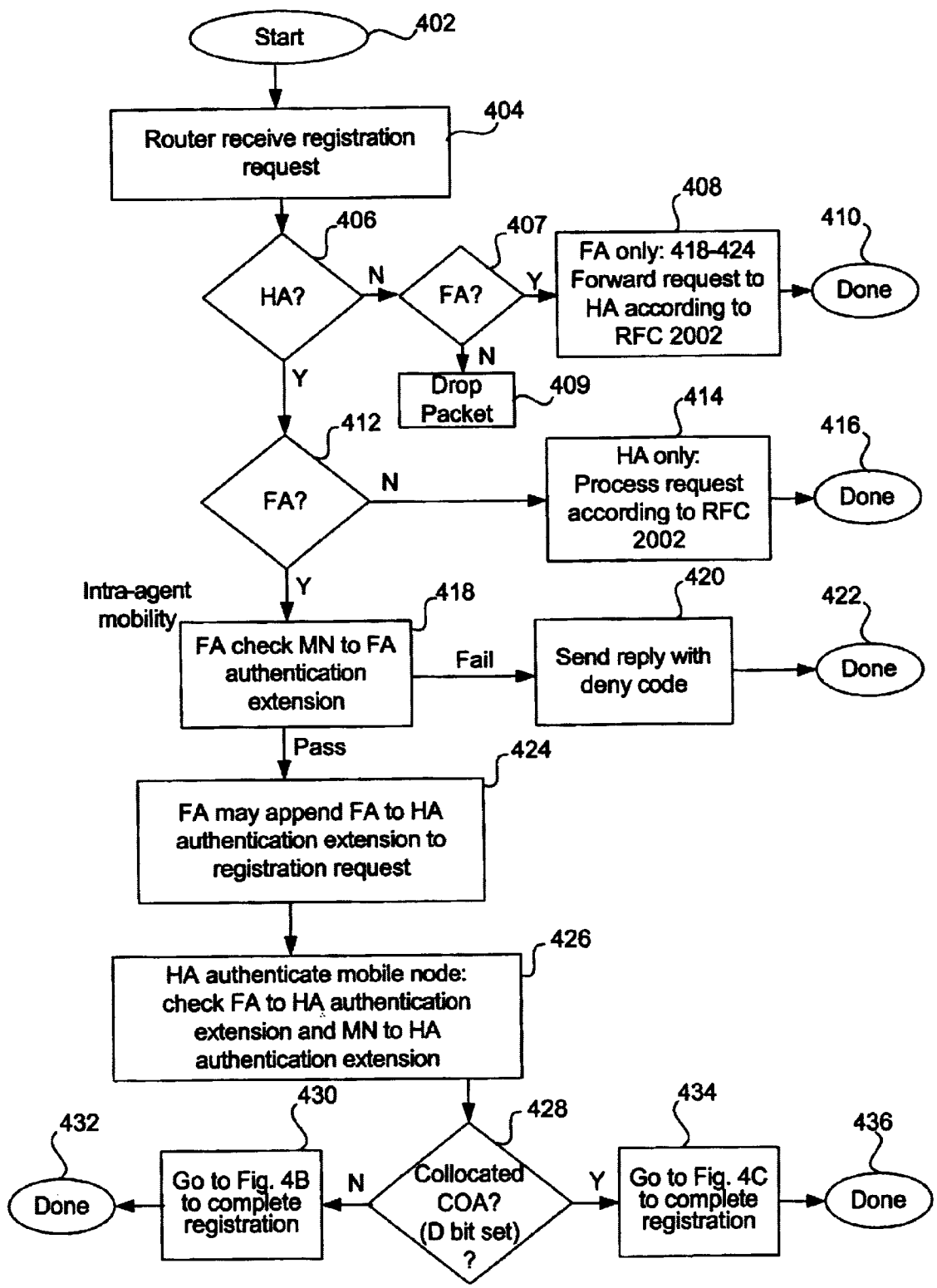
FIG. 4A is a process flow diagram illustrating the processes performed by a Mobile IP router permitting intra-agent mobility during registration of a mobile node according to an embodiment of the invention.
Figure 4B:
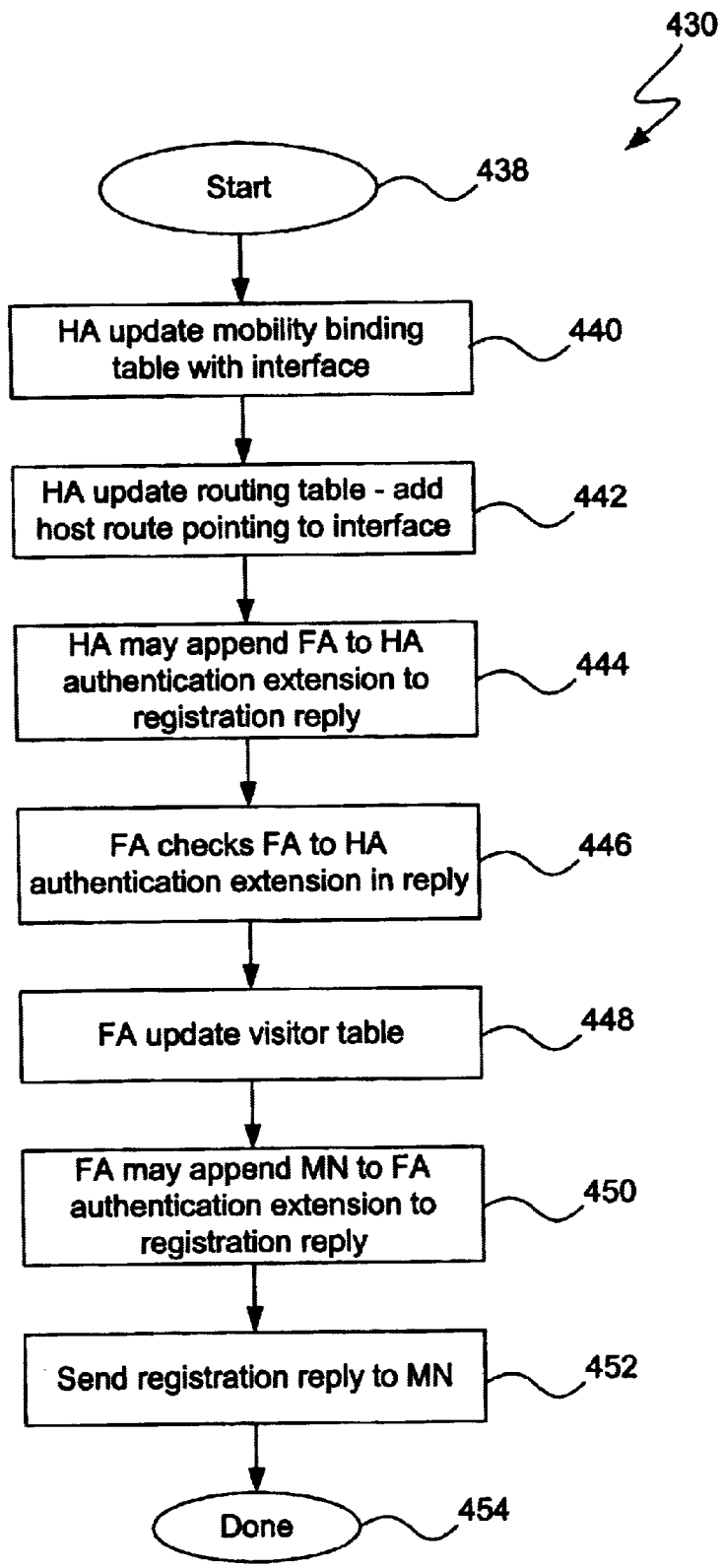
FIG. 4B is a process flow diagram illustrating the processes performed by the Mobile IP router to complete registration of the mobile node when the mobile node is using the Foreign Agent address as its care-of address according to an embodiment of the invention.
Figure 4C:
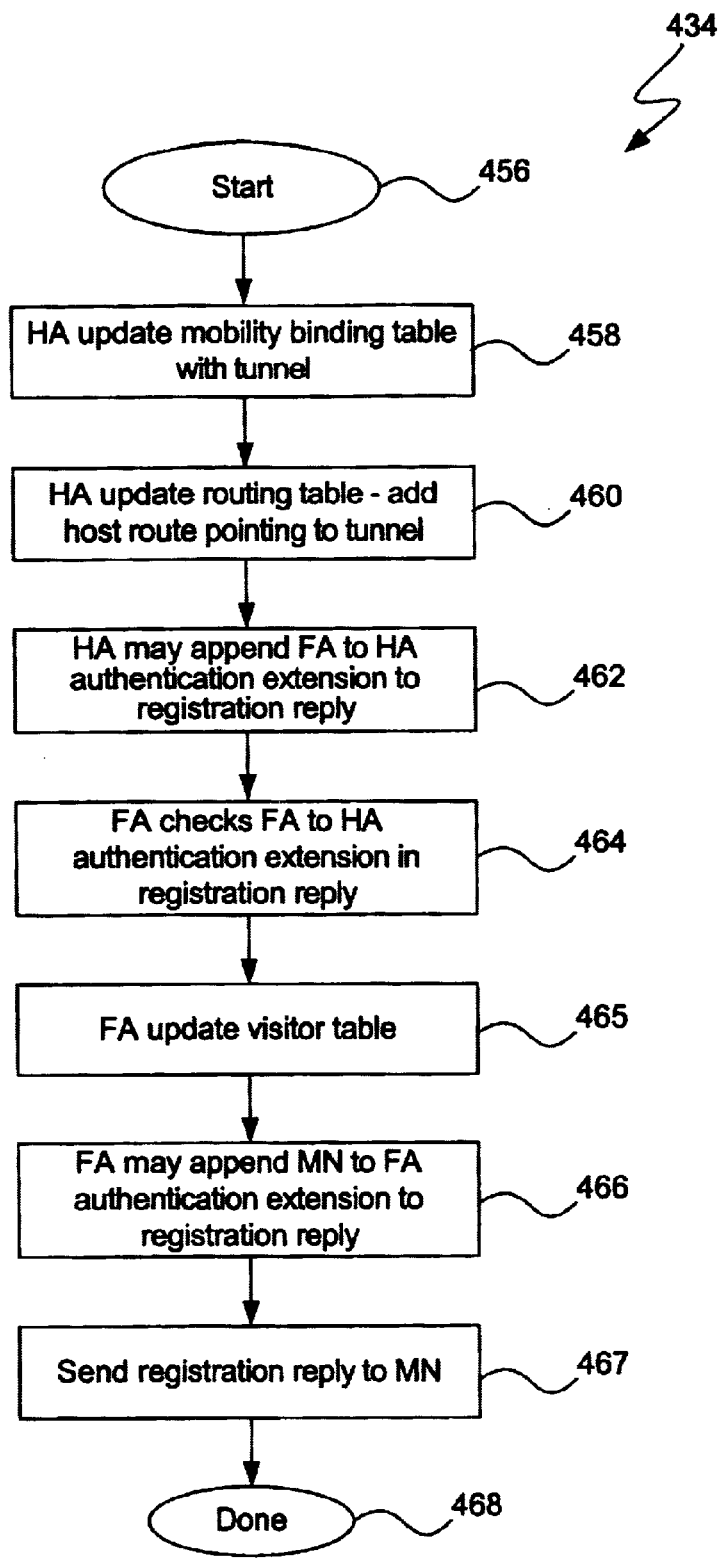
FIG. 4C is a process flow diagram illustrating the processes performed by the Mobile IP router to complete registration of the mobile node when the mobile node is using a collocated care-of address as its care-of address according to an embodiment of the invention.

The registration process performed by a mobile node and the router to enable intra-agent mobility is described with reference to FIGS. 3–4C. FIG. 3 is a process flow diagram illustrating the processes performed by a mobile node during registration according to an embodiment of the invention. As shown, the registration process begins at block 302 and at block 304 the process flow diverges depending upon whether the mobile node connects through a foreign agent. If there is a foreign agent, the care-of address of the mobile node is an address of the foreign agent. If there is no foreign agent, a collocated care-of address is obtained at block 306. A collocated care-of address is an IP address temporarily assigned to an interface of the mobile node itself. Thus, the care-of address may be an IP address associated with the mobile node. Through the use of a collocated care-of address, packets may be tunneled directly to the mobile node.

Once the care-of address has been obtained, a registration request is composed at block 308. As will be shown and described with reference to FIG. 5, the registration request includes a Mobile-Home authentication extension and may include other extensions to be used for authentication or other purposes. The registration request, once composed, is sent via the care-of address at block 310 and initial steps performed by the mobile node are completed at block 312.

Once the registration request is sent, the router completes the registration process. FIG. 4A is a process flow diagram illustrating the processes performed by a Mobile IP router permitting intra-agent mobility during registration of a mobile node according to an embodiment of the invention. As shown, the process begins at block 402 and at block 404, the router receives the registration request packet. As will be shown in FIG. 5, the registration request packet specifies a Home Address associated with the mobile node as well as a care-of address associated with the mobile node. In order to complete the registration process, it is necessary to determine whether intra-agent mobility or inter-agent mobility is desired. If inter-agent mobility is desired, registration may be completed according to RFC 2002. However, if intra-agent mobility is desired, registration may be completed as shown and described with reference to FIGS. 4A–4C.

In order to determine whether intra-agent mobility is desired by the mobile node, it is desirable to ascertain whether the router includes the Home Agent and the Foreign Agent being accessed by the mobile node. If it is determined that the router includes both the Home Agent and the Foreign Agent, the mobile node is registered with the Home Agent to enable intra-agent mobility.

First, the router determines whether it includes the Home Agent with which the mobile node is registering at block 406. Thus, at block 406, it is ascertained whether the Home Address specified in the registration request packet is equivalent to a Home Agent address associated with the router. If it is determined that the Home Address specified in the registration request packet is not equivalent to a Home Agent address of the router, the router does not include the Home Agent with which the mobile node is registering. Next, at block 407, it is determined whether the router includes the Foreign Agent that the mobile node is visiting. This step is described in further detail with reference to block 412. If the router does not include the Foreign Agent that the mobile node is visiting, the packet is dropped at block 409. However, if it is determined that the router includes the Foreign Agent that the mobile node is visiting, the router includes only a Foreign Agent for this registration. Therefore, the Foreign Agent checks the Mobile Node-Foreign Agent authentication extension in the registration request packet as described at block 418. If authentication fails, a reply packet indicating that registration is denied is sent as shown at block 420 and the process ends as indicated at block 422. However, if authentication passes, the Foreign Agent may append a Foreign Agent-Home Agent authentication extension to the registration request packet at block 424. In order to complete registration, the registration request packet is then forwarded to a Home Agent associated with the mobile node at block 408. This may be performed as provided in RFC 2002. The process completes at block 410.

If the router determines that it includes the Home Agent associated with the Home Address at block 406, the router also determines whether it includes the Foreign Agent that the mobile node is visiting at block 412. There are two possible scenarios in which the router may include the Foreign Agent that the mobile node is visiting. First, it is ascertained whether the care-of address specified in the registration request packet is equivalent to a Foreign Agent address associated with the router (e.g., the care-of address advertised by the router). Second, if it is determined that the care-of address specified in the registration request packet is not equivalent to the router's Foreign Agent address, it is determined whether the D bit is set and the care-of address is a collocated care-of address (e.g., an address on the network of the inbound interface). This scenario occurs when the foreign agent advertises with the registration required bit (R-bit) set and the mobile node uses a collocated care-of address to register through the foreign agent. In other words, even where the mobile node uses a collocated care-of address, it must still register through the foreign agent when the R-bit is set. If neither of these conditions is true, the router does not include the Foreign Agent that the mobile node is visiting. In other words, the router includes only a Home Agent associated with the Home Agent address. Thus, in order to complete registration, the registration request packet is processed by the Home Agent at block 414. This may be performed according to RFC 2002. The process completes at block 416.

If it is determined at block 412 that the router includes the Foreign Agent associated with the care-of address, the router includes both the Home Agent and the Foreign Agent being accessed by the mobile node, and the mobile node may be registered with the Home Agent. As will be described below, the registration may be performed without creating a tunnel interface to reach the mobile node or the Home Agent.

Before registration may be performed, it is determined whether the registration is authenticated. This may be accomplished through authentication extensions such as the Mobile-Home authentication extension as provided by RFC 2002. In addition, a Mobile-Foreign authentication extension and a Foreign-Home authentication extension may be provided. In this manner, the identity of each entity may be authenticated during registration. However, these additional authentication extensions merely provide added levels of security and are therefore optional.

During authentication, the Foreign Agent checks the Mobile Node-Foreign Agent authentication extension in the registration request packet at block 418. If authentication fails, a reply packet indicating that registration is denied is sent at block 420 and the process ends as indicated at block 422. However, if authentication passes, the Foreign Agent may append a Foreign Agent-Home Agent authentication extension to the registration request packet at block 424. The Home Agent may then authenticate the mobile node using the Foreign Agent-Home Agent authentication extension and the Mobile Node-Home Agent authentication extension at block 426. Once authentication is complete, registration of the mobile node with the Home Agent may be performed.

During registration, the appropriate tables are made available to the Home Agent and the Foreign Agent. More particularly, the Home Agent has an associated routing table having an entry for one or more mobile nodes to enable the Home Agent to forward packets to the mobile nodes. In addition, the Home Agent has an associated mobility binding table that associates a mobile node with a care-of address upon registration with the Home Agent. Moreover, the Foreign Agent has a visitor table that lists an address of each mobile node being serviced by the Foreign Agent. Thus, in order to enable intra-agent mobility, these tables are updated as necessary. This updating process may vary depending upon whether the care-of address is a foreign agent address or a collocated care-of address. As shown, the process flow diverges at block 428. If it is determined that the care-of address specified in the registration request packet is a foreign agent address, registration is completed at block 430 and the process ends at block 432. Block 430 is shown and described in detail with reference to FIG. 4B. Alternatively, if it is determined that the care-of address specified in the registration request packet is a collocated address, registration is completed at block 434, shown in detail in FIG. 4C. The process ends at block 436.

As described above, the router has an associated routing table, mobility binding table, and visitor table which are updated during the registration process. FIG. 4B is a process flow diagram illustrating the processes performed by the Mobile IP router to complete registration of the mobile node as shown in block 430 of FIG. 4A when the mobile node is using the Foreign Agent address as its care-of address according to an embodiment of the invention. The process begins at block 438 and at block 440, the Home Agent updates a mobility binding table with a care-of address associated with the mobile node and an interface associated with the mobile node to indicate that the mobile node has registered with the Home Agent. The interface may be a physical interface on the router rather than a tunnel interface which is typically provided in the mobility binding table. Thus, the mobility binding table may be updated without creating or specifying a tunnel interface to reach the mobile node.

A routing table is similarly updated during the registration process. As shown at block 442, the Home Agent updates a routing table with the interface to enable the router to forward a packet to the mobile node via the interface. As indicated above, the interface may be a physical interface. Thus, the routing table may be updated without creating or specifying a tunnel interface to reach the mobile node.

Once the routing and mobility binding tables are updated by the Home Agent, the Home Agent may compose a registration reply packet. More particularly, the Home Agent may append the Foreign Agent-Home Agent authentication extension to the registration reply packet at block 444. The Foreign Agent may then continue the registration process using the information provided in the registration reply packet.

As shown, the Foreign Agent continues the registration process using the registration reply packet at block 446. At block 446, the Foreign Agent checks the Foreign Agent-Home Agent authentication extension if provided in the registration reply packet. The Foreign Agent then updates its visitor table at block 448. More particularly, the visitor table is updated to include an address of the mobile node to indicate that the mobile node is being serviced by the Foreign Agent and an associated physical interface. Accordingly, the visitor table is updated without creating or specifying a tunnel interface to reach the Home Agent. Once the visitor table is updated, the Foreign Agent may append a Mobile Node-Foreign Agent authentication extension to the registration reply packet at block 450. The Foreign Agent then sends the registration reply packet to the mobile node at block 452. The process ends as shown at block 454.

When the mobile node uses a collocated care-of address, the tables are updated in a slightly different manner. FIG. 4C is a process flow diagram illustrating the processes performed by the Mobile IP router to complete registration of the mobile node as shown in block 434 of FIG. 4A when the mobile node is using a collocated care-of address as its care-of address according to an embodiment of the invention. The process begins at block 456 and at block 458, the Home Agent updates its mobility binding table. Since the mobile node is using a collocated care-of address, a packet must be encapsulated. Thus, rather than updating the mobility binding table with a physical interface, the mobility binding table is updated with a tunnel interface to perform this encapsulation. Similarly, at block 460, the routing table is updated with a host route pointing to the tunnel interface. Since a collocated care-of address is used rather than the Foreign Agent address, a visitor table is not updated.

Once the tables are updated, the Home Agent may append the Foreign Agent-Home Agent authentication extension to the registration reply packet at block 462. The Foreign Agent then checks the Foreign Agent-Home Agent authentication extension in the registration reply packet, if present, at block 464. The Foreign Agent updates the visitor table as necessary at block 465. The Foreign Agent may then append a Mobile Node-Foreign Agent authentication extension to the registration reply at block 466. The Foreign Agent then sends the registration reply packet to the mobile node at block 467 and the process ends at block 468.

Upon completion of registration, a mobile node may roam to the Foreign Agent and continue to receive packets addressed to the mobile node via the Home Agent. Thus, a packet addressed to the mobile node may be received from a corresponding node. The packet is then forwarded to the mobile node via a physical interface. As indicated above, where the care-of address is the Foreign Agent address rather than a collocated care-of address, the packet may be forwarded without encapsulating or tunneling the packet. In this manner, a corresponding node may continue to communicate with a mobile node using the mobile node's home address.

Figure 5:
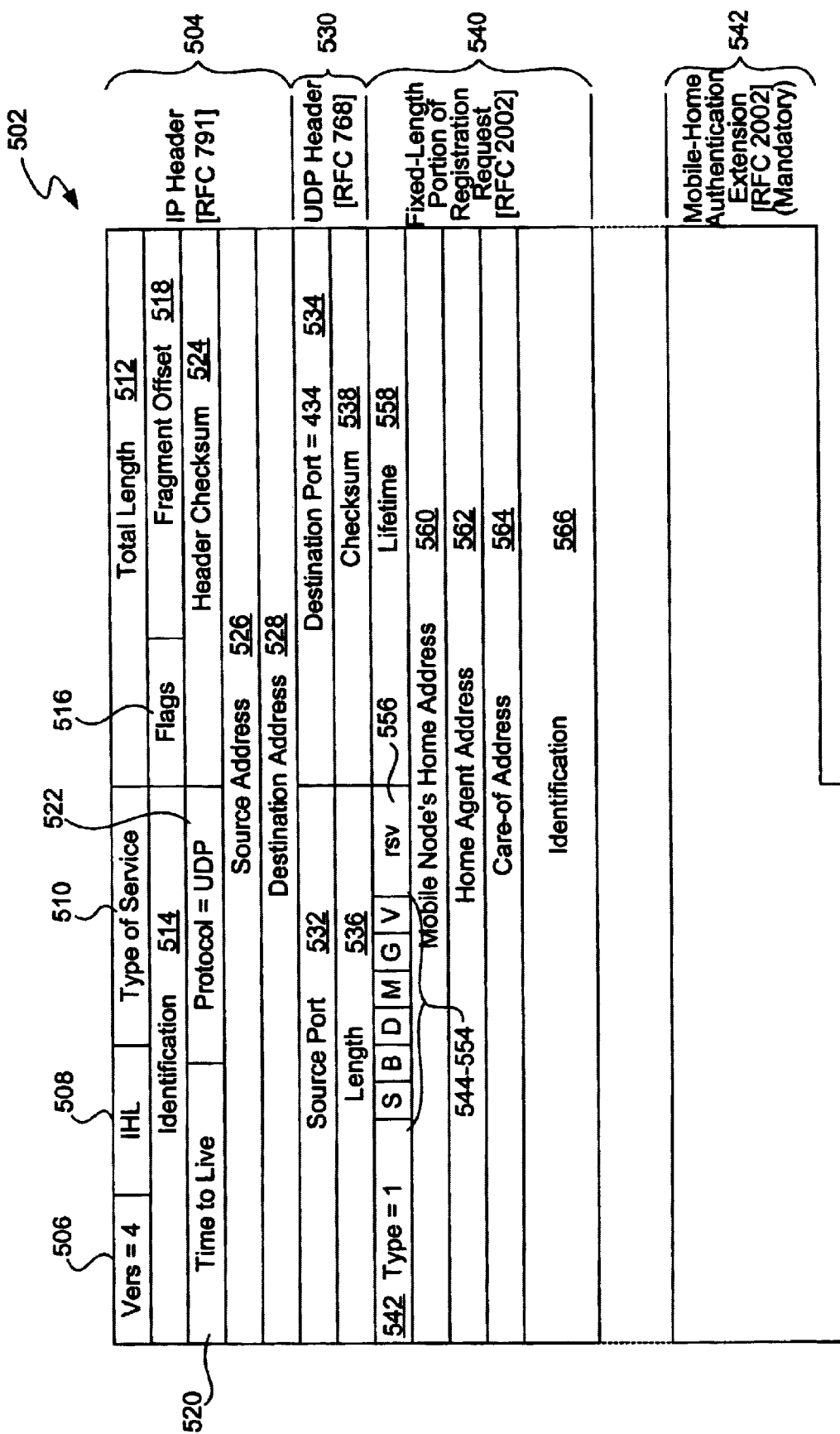
FIG. 5 is a diagram illustrating a registration request having a Mobile-Home Authentication Extension that may be sent by a mobile node in accordance with an embodiment of the invention.

The RFC provides a format for a registration request packet as well as optional extensions. FIG. 5 is a diagram illustrating a registration request having a Mobile-Home Authentication Extension that may be sent by a mobile node in accordance with an embodiment of the invention. As shown, a registration request packet 502 includes an IP Header 504 as defined in RFC 791. As is well-known in the field, the IP Header 504 includes a version field 506 which specifies which versions of the Internet Protocol are represented in the registration request packet 502. An Internet Header Length (IHL) field 508 provides the length of the IP header 504. In addition, a Type of Service field 510 is used to specify how the registration request packet 502 is to be handled in networks which offer various service qualities. A Total Length field 512 gives the length of the registration request packet in bytes. In addition, an Identification field 514 is a unique value chosen by the sender to allow a recipient to reassemble a packet that had been separated into fragments. A Flags field 516 and a Fragment Offset field 518 are both to separate an IP registration request packet into fragments to traverse networks that are unable to handle large IP packets. A Time to Live field 520 is used to limit the number of times an individual IP packet may be forwarded. A Protocol field 522 is used by the IP layer to determine which higher layer protocol created the "payload," or data passed down from the higher layer protocol, within the IP packet. A Header Checksum field 524 is used by a receiving node to verify that there was no error in transmission of the IP-header portion of the packet. In addition, the IP Header 504 includes a source address 526 and a destination address 528 of the registration request packet 502.

A UDP Header field 530 is provided by RFC 768. As is well-known in the field, the UDP Header field 530 includes a Source Port field 532, which is selected by the mobile node sending the registration request packet 502. In addition, a mobile node sets Destination Port field 534 to 434, the value reserved for Mobile IP registration messages. UDP Length field 536 provides the size of the UDP Payload (i.e., the Mobile IP fields) measured in bytes. In addition, a Checksum field 538 permits a receiving node to determine if an error occurred in transmission.

The registration request packet 502 further includes a Fixed-Length Portion 540 of the Registration Request which includes the Mobile IP Fields as provided in RFC 2002. As shown, the Fixed-Length Portion 540 includes multiple fields. A Type field 542 identifies the message as either a Registration Request or a Registration Reply. In addition, the mobile node sets an S bit 544 to 1 to ask that its home agent create or delete a binding for the specified care-of address without affecting any other existing bindings.

B, D, M, G, and V bits provide information required for routing of the registration request packet 502. A B bit 546 is set to 1 by a mobile node to request that the home agent provide it a copy of broadcast packets that occur on the home link. A D bit 548 informs the home agent which entity is performing decapsulation. The D bit 548 is set to 1 for a collocated-of address and is set to b for a foreign agent care-of address. An M bit 550 and a G bit 552 request that the home agent use minimal encapsulation [RFC 2004] or generic routing encapsulation [RFC 1701] respectively, instead of IP in IP encapsulation [RFC 2003] for tunneling. A V bit 554 is set to 1 if the mobile node and foreign agent can support Van, Jacobson Header Compression [RFC 1144] across the foreign link. In addition, an rsv field 556 may be reserved for future use.

The remaining fields provide information that may be used during registration of the mobile node. The mobile node sets lifetime field 558 to the number of seconds it would like its registration to last before it expires. In addition, a Mobile Node's Home Address 560 and Home Agent Address 562 are specified. Care-of Address field 564 is set to the specific care-of address being registered or deregistered by the mobile node. In addition, an Identification field 566 is chosen to be unique for each attempted registration. The Identification field 566 permits the mobile node to match Registration Requests with the corresponding Replies. This prevents an outsider from saving a copy of the Registration Request and resending it at a later time.

Each Registration Request message is required to contain a Mobile Node-Home Agent Authentication Extension [RFC 2002] 542 to prove that the message was sent by the node that claims to have sent it. In addition, the RFC provides for optional extensions. However, the RFC does not suggest implementation details for these optional extensions. Thus, a Mobile Node-Foreign Agent authentication extension and a Foreign Agent-Home Agent authentication may be provided and checked during the registration process as described above with reference to FIGS. 3–4C.

Figure 6A:
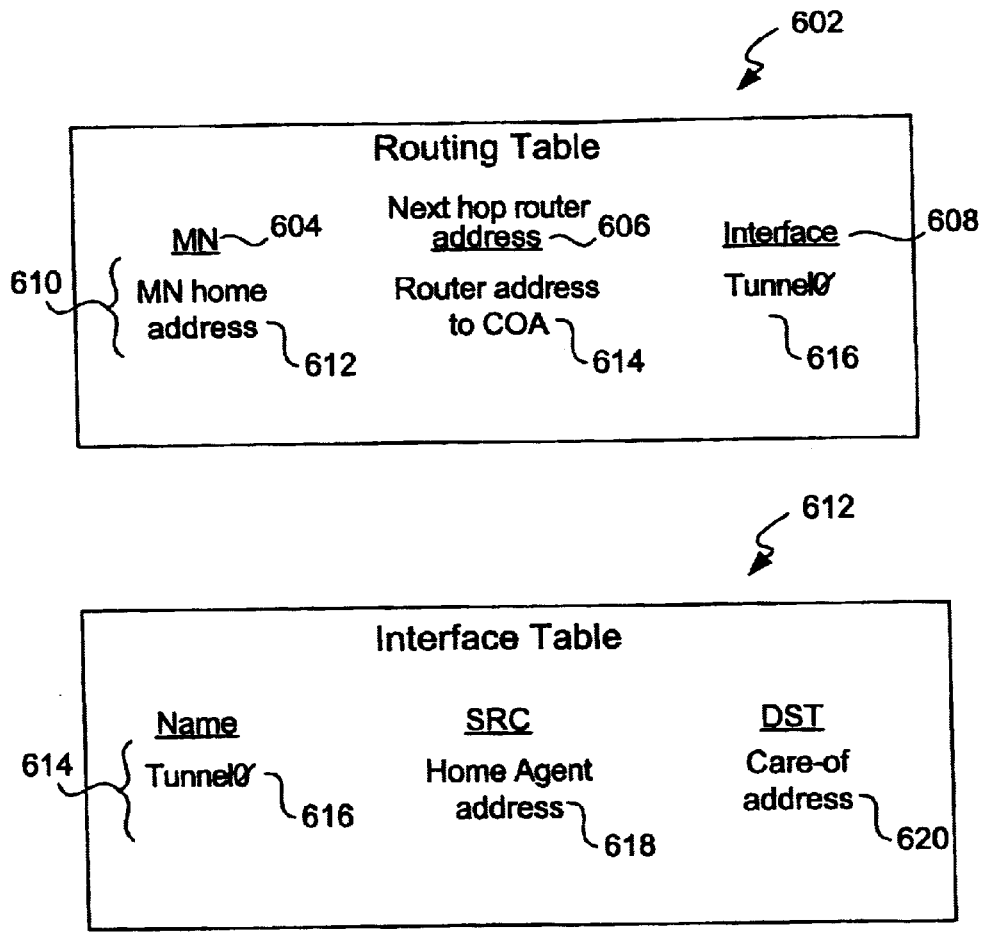
FIG. 6A is a diagram illustrating conventional routing and interface tables associated with a Foreign Agent that may be used by an active Home Agent to enable inter-agent mobility.

As described above, routing, mobility binding, and visitor tables may be updated during the registration process. Although such tables are commonly updated during the registration process, these tables typically include tunnel interfaces rather than physical interfaces. As a result, an interface table is usually implemented to define such tunnel interfaces. FIG. 6A is a diagram illustrating conventional routing and interface tables associated with a Foreign Agent that may be used by an active Home Agent to enable inter-agent mobility. A routing table is commonly used to route packets to each mobile node supported by the Home Agent. As shown in FIG. 6A, a routing table 602 typically includes a target field 604, a next hop field 606, and an interface field 608. When a node has an IP packet to forward, it searches its routing table 602 for an entry whose target field 604 matches the IP destination address in the packet header of the packet being forwarded. If it finds a matching entry, the node forwards the packet to the node identified by the next hop field 606 in that entry via the link specified in the interface field 608 of that entry. Thus, each entry 610 typically specifies a home address 612 associated with a mobile node, an IP address of the next hop router to the care-of address for the mobile node 614, and a tunnel interface 616. Thus, the interface will provide an identifier of the tunnel created during registration. Packets addressed to mobile nodes may therefore be identified by the Home Agent and tunneled to the care-of addresses specified in the routing table.

In order to define the tunnels created during registration, an interface table 612 is typically implemented. As shown, each entry 614 in the interface table 612 typically specifies a tunnel name of the interface 616 (e.g., tunnel 0), a source address of the tunnel (e.g., Home Agent address) 618, and a destination address of the tunnel (e.g., care-of address) 620.

Figure 6B:
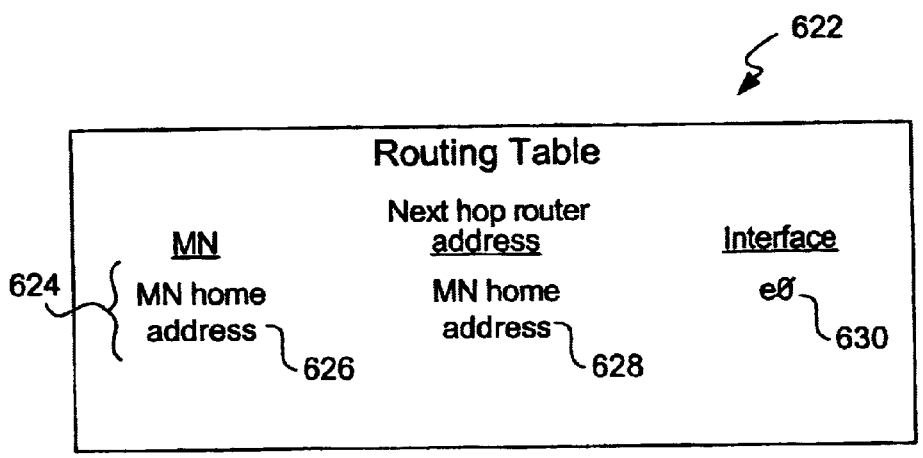
FIG. 6B is a diagram illustrating an exemplary routing table that may be used by the Mobile IP router in accordance with an embodiment of the invention.

As described above, the creation of tunnels requires that the tunnels be defined in an interface table. However, such a table may consume a substantial amount of memory. Through the use of the present invention, interfaces may be specified without the creation of tunnels. As a result, such memory consumption is substantially reduced. Moreover, since a tunnel name associated with an interface need not be retrieved, the efficiency of the packet forwarding process is substantially improved. FIG. 6B is a diagram illustrating an exemplary routing table that may be used by the Mobile IP router in accordance with an embodiment of the invention. Routing table 622 includes an entry for the mobile node to enable the Home Agent to forward a packet to the mobile node. As indicated above, each entry 624 specifies a home address associated with a mobile node 626. However, the next hop field specifies a home address associated with the mobile node 628. Moreover, the interface field includes a physical interface 630 associated with the mobile node rather than a tunnel interface. Accordingly, the routing table is created without specifying a tunnel interface to reach the mobile node. The routing table may similarly include entries associated with multiple mobile nodes.

Figure 7A:
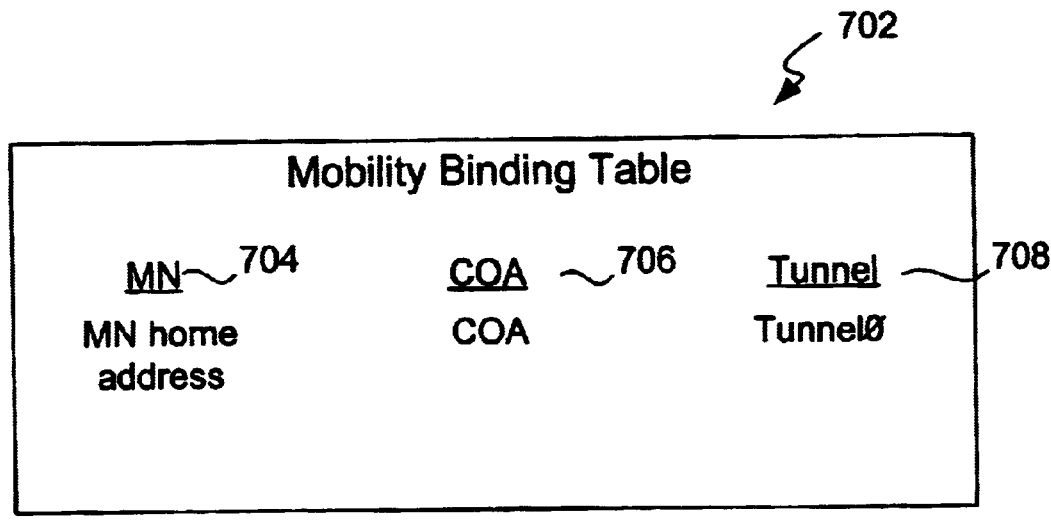
FIG. 7A is a diagram illustrating a conventional mobility binding table associated with a Foreign Agent that may be used by an active Home Agent to enable inter-agent mobility.

In order to enable inter-agent mobility by a mobile node, a mobility binding table associates the mobile node with a care-of address upon registration of the mobile node with the Home Agent. FIG. 7A is a diagram illustrating a conventional mobility binding table associated with a Foreign Agent that may be used by an active Home Agent. As shown, a conventional mobility binding table 702 associates a mobile node 704 with care-of address 706. The mobile node 704 is often specified by its home address. In addition, the mobility binding table 702 typically includes a tunnel interface 708 (e.g., tunnel 0) for the mobile node. Moreover, the mobility binding table 702 may include care-of address associations for additional mobile nodes based with the same Home Agent. In this manner, one or more mobile nodes may be linked to a Foreign Agent that has registered a Mobile IP connection.

Figure 7B:
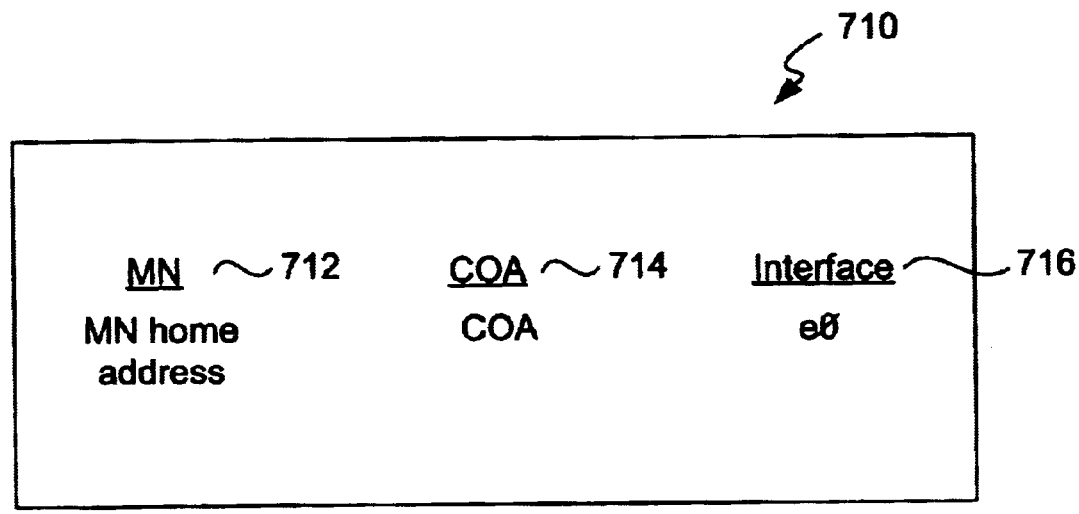
FIG. 7B is a diagram illustrating an exemplary mobility binding table that may be used by the Mobile IP router in accordance with an embodiment of the invention.

FIG. 7B is a diagram illustrating an exemplary mobility binding table that may be used by the Mobile IP router in accordance with an embodiment of the invention. As indicated above, the mobility binding table includes an entry for each of the mobile nodes that have registered with the Home Agent. Mobility binding table 710 similarly associates each such mobile node 712 with care-of address 714. The care-of address 714 may be a foreign agent address as well as a collocated care-of address. The mobile node 712 may be specified by its home address, as shown. However, rather than specifying a tunnel interface, the interface is a physical interface 716 (e.g., E0) associated with the mobile node. Therefore, the mobility binding table is created without specifying a tunnel interface to reach the mobile node.

Figure 8A:
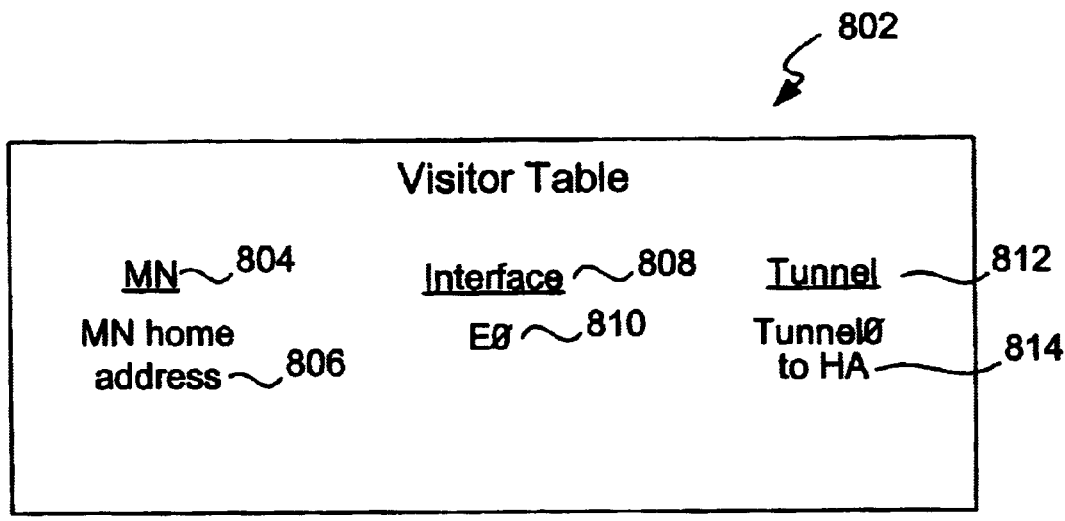
FIG. 8A is a diagram illustrating a conventional visitor table that may be used by an active Foreign Agent to enable inter-agent mobility.

A Foreign Agent may map connectivity to the mobile nodes through the use of a visitor table. FIG. 8A is a diagram illustrating a conventional visitor table that may be used by an active Foreign Agent to enable inter-agent mobility. As shown, visitor table 802 associates mobile node 804 having a home address 806 with an interface 808 such as E0 810 and its Home Agent through specifying a tunnel 812 such as tunnel 0 to the Home Agent 814. Therefore, information for each mobile node, including a tunnel interface, is typically stored in the visitor table.

Figure 8B:
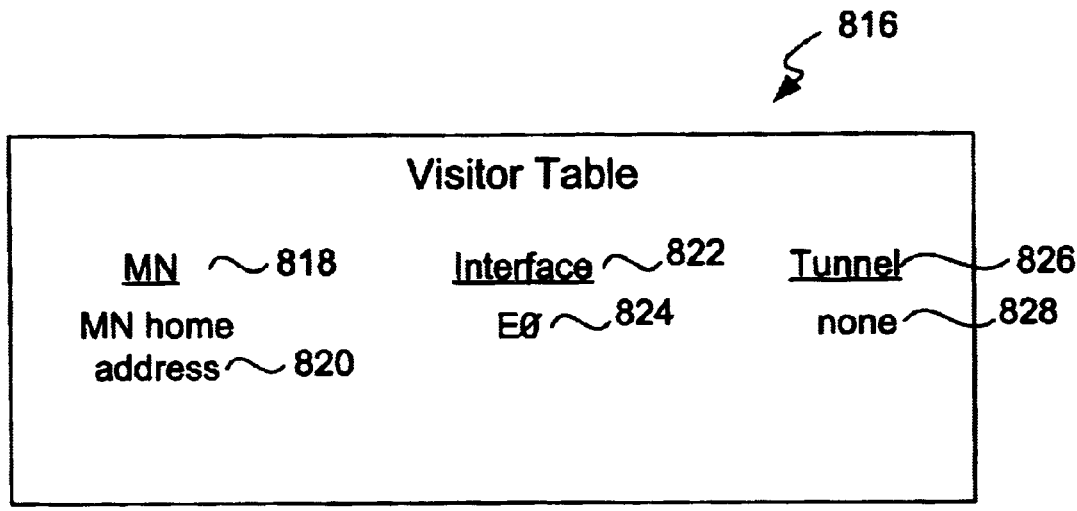
FIG. 8B is a diagram illustrating an exemplary visitor table that may be used by the Mobile IP router in accordance with an embodiment of the invention.

As described above, a tunnel is typically created to reach each mobile node associated with the Home Agent. Moreover, information defining each created tunnel is typically stored in an interface table. Rather than storing tunnel information for each mobile node in the visitor table, it would be preferable if such information could be eliminated, thereby reducing the amount of memory consumed. FIG. 8B is a diagram illustrating an exemplary visitor table that may be used by the Mobile IP router in accordance with an embodiment of the invention. As shown, visitor table 816 lists an address of a mobile node to indicate that the mobile node is being serviced by the Foreign Agent and the router. Here, visitor table 816 associates mobile node 818 having a home address 820 with an interface 822. However, according to the present invention, rather than specifying a tunnel interface to reach the Home Agent, the interface 822 is a physical interface such as E0 824. Thus, tunnel field 826 need not specify tunnel data as shown at 828 for those entries specifying a physical interface 824 in the interface field 822. As a result, a visitor table that lists addresses of all mobile nodes being serviced by the router and associated physical interfaces may be created without specifying a tunnel interface to reach the Home Agent for at least some of the entries. Although one entry is illustrated, the visitor table 816 may list entries for multiple mobile nodes being serviced by the router. Thus, a visitor table 816 having a structure identical to that illustrated in FIG. 8A may be used to include those entries that do not require that tunnel data be stored as well as those entries that have corresponding tunnel data. Accordingly, the amount of data stored in a single visitor table may be dramatically reduced.

Figure 9:
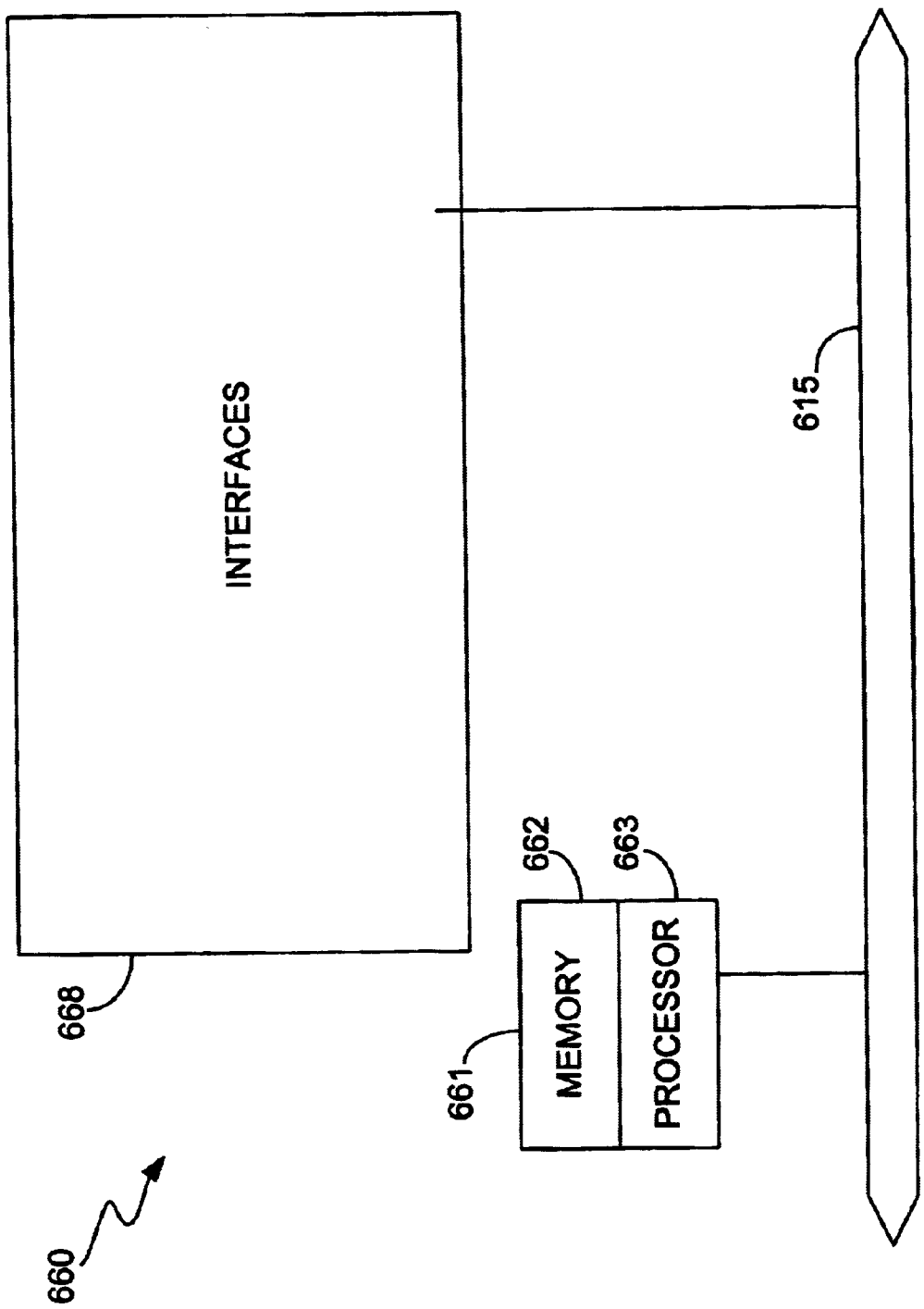
FIG. 9 is a block diagram of a network device that may be configured to implement aspects of the present invention.

Through the use of a network device having both a Home Agent and a Foreign Agent, intra-agent mobility may be realized. FIG. 9 is a block diagram of a network device that may be configured to implement aspects of the present invention. The apparatus (Home Agent, Foreign Agent, and/or mobile router) of this invention may be implemented in software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine 5 may be a network device designed to handle network traffic. Such network devices typically have multiple network interfaces including frame relay and ISDN interfaces, for example. Specific examples of such network devices include routers and/or switches. For example, the systems of this invention may be specially configured routers such as, for example, specially configured router models 1600, 2500, 2600, 3600, 4500, 4700, 7200, and 7500 available from Cisco Systems, Inc. of San Jose, Calif. A general architecture for some of these machines will appear from the description given below. In an alternative embodiment, the system of the present invention may be implemented on a general-purpose network host machine such as a personal computer or workstation. Further, the invention may be at least partially implemented on a card (e.g., an interface card) for a network device or a general-purpose computing device.

Generally, the intra-agent mobility technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid intra-agent mobility system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the intra-agent mobility systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the intra-agent mobility system may be implemented on a general-purpose network host machine such as a personal computer or workstation. Further, the invention may be at least partially implemented on a card (e.g., an interface card) for a network device or a general-purpose computing device.

Referring now to FIG. 9, a router 660 suitable for implementing the present invention includes a master central processing unit (CPU) 662, interfaces 668, and a bus 615 (e.g., a PCI bus). When acting under the control of appropriate software or firmware, the CPU 662 is responsible for such router tasks as routing table computations and network management. It may also be responsible for performing other functions such as updating a mobility binding table as well as a visitor table. It preferably accomplishes all these functions under the control of software including an operating system (e.g., the Internetwork Operating System (IOS®) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 660. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 660. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 661) configured to store program instructions for the general-purpose network operations and intra-agent mobility functions described herein. The program instructions may control the operation of an operating system and/or one or more applications, for example. The memory or memories may also be configured to store tables such mobility binding and visitor tables.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. In addition, the above-described process steps may be performed in a different order. Similarly, alternate process steps may be performed to achieve intra-agent roaming without requiring that tunnels be created. Accordingly, the present embodiments are to be considered as illustrative and not restrictive, and the invention is not to be limited to the details given herein, but may be modified within the scope and equivalents of the appended claims.

What is claimed is:

1. In a router supporting Mobile IP, a method of registering a mobile node with a Home Agent via a Foreign Agent, the method comprising:

receiving a registration request packet, the registration request packet specifying a Home Address and a care-of address;

ascertaining from the registration request packet whether the router includes a Home Agent associated with the mobile node;

if it is ascertained from the registration request packet that the router does not include the Home Agent, forwarding the registration request packet to the Home Agent, wherein the Home Agent is external to the router;

determining whether the care-of address specified in the registration request packet is equivalent to a Foreign Agent address associated with the router; and if it is ascertained from the registration request packet that the router includes the Home Agent and it is determined that the care-of address specified in the registration request packet is equivalent to the Foreign Agent address associated with the router, registering the mobile node visiting a Foreign Agent of the router with a Home Agent of the router.

2. The method as recited in claim 1, wherein registering the mobile node comprises:
   updating a mobility binding table associated with the Home Agent of the router with an entry associated with the mobile node that has registered with the Home Agent of the router, wherein the entry in the mobility binding table identifies a care-of address associated with the mobile node; and
   updating a visitor table associated with the Foreign Agent of the router that lists addresses of all mobile nodes being serviced by the Foreign Agent of the router such that the visitor table includes an entry for the mobile node that has registered with the Home Agent of the router.

3. The method as recited in claim 1, wherein the care-of address is a foreign-agent address or a collocated care-of address.

4. The method as recited in claim 2, wherein the mobility binding table further includes a physical interface field associated with the mobile node, the physical interface field specifying a physical interface on the router.

5. The method as recited in claim 2, wherein the mobility binding table is created without specifying a tunnel interface to reach the mobile node.

6. The method as recited in claim 2, wherein the visitor table is created without specifying a tunnel interface to reach the Home Agent of the router.

7. The method as recited in claim 1, wherein upon completion of registering the mobile node visiting the Foreign Agent of the router with the Home Agent of the router, the mobile node can visit the Foreign Agent of the router and receive packets addressed to the mobile node via the Home Agent of the router.

8. The method as recited in claim 1, wherein the Home Agent of the router is on a first interface of the router and the Foreign Agent of the router is on a second interface of the router.

9. The method as recited in claim 1, further comprising:
   maintaining a routing table, wherein the routing table includes a physical interface field associated with the mobile node that specifies a physical interface on the router, thereby enabling the Home Agent of the router to forward a packet to the mobile node.

10. The method as recited in claim 9, wherein the routing table is does not specify a tunnel interface to reach the mobile node.

11. The method as recited in claim 9, wherein the routing table includes a next hop field specifying a home address associated with the mobile node.

12. The method as recited in claim 2, wherein the mobility binding table identifies a physical interface on the router associated with the mobile node.

13. The method as recited in claim 1, wherein registering the mobile node is performed without creating a tunnel interface to reach the mobile node.

14. The method as recited in claim 1, wherein registering the mobile node is performed without creating a tunnel interface to reach the Home Agent.

15. The method as recited in claim 1, wherein determining comprises:
   determining whether the care-of address specified in the registration request packet is advertised by the router as the Foreign Agent address associated with the router.

16. The method as recited in claim 1, further comprising:
   determining whether the care-of address specified in the registration request packet is a collocated care-of address;
   determining whether a D bit in the registration request packet is set; and
   if it is ascertained from the registration request packet that the router includes the Home Agent and if it is determined that the care-of address specified in the registration request packet is a collocated care-of address and the D bit in the registration request packet is set, registering the mobile node via a Foreign Agent of the router with a Home Agent of the router.

17. The method as recited in claim 1, wherein after registering the mobile node visiting the Foreign Agent of the router with the Home Agent of the router, packets addressed to the mobile node are forwarded by the Home Agent of the router to the Foreign Agent of the router via a physical interface.

18. The method as recited in claim 1, wherein registering the mobile node comprises:
   updating a routing table with a physical interface on the router to enable the router to forward a packet to the mobile node via the physical interface.

19. The method as recited in claim 18, wherein updating the routing table is performed without creating or specifying a tunnel interface to reach the mobile node.

20. The method as recited in claim 1, wherein registering the mobile node comprises:
   updating a mobility binding table of the Home Agent of the router with a care-of address associated with the mobile node and a physical interface associated with the mobile-node to indicate that the mobile node has registered with the Home Agent via the care-of address, the physical interface being an interface on the router.

21. The method as recited in claim 20, wherein updating the mobility binding table is performed without creating or specifying a tunnel interface to reach the mobile node.

22. The method as recited in claim 1, wherein registering the mobile node comprises updating a visitor table of the Foreign Agent of the router to include an address of the mobile node to indicate that the mobile node is being serviced by the Foreign Agent of the router and an associated physical interface on the router without creating or specifying a tunnel interface to reach the Home Agent of the router.

23. The method as recited in claim 1, further comprising:
   receiving a packet addressed to the mobile node from a corresponding node; and
   forwarding the packet to the mobile node via a physical interface on the router.

24. The method as recited in claim 23, wherein forwarding the packet is performed without encapsulating or tunneling the packet.

25. The method as recited in claim 23, wherein forwarding the packet is performed without creating a tunnel interface.

26. The method as recited in claim 1, wherein the Home Agent of the router is associated with a first interface of the router and the Foreign Agent of the router is associated with a second interface of the router.

27. The router as recited in claim 26, wherein the first interface is the second interface.

28. The router as recited in claim 26, wherein the first interface is different from the second interface.

29. A computer-readable medium storing thereon computer-readable instructions for registering a mobile node with a Home Agent via a Foreign Agent in a router supporting Mobile IP, comprising:

instructions for receiving a registration request packet, the registration request packet specifying a Home Address and a care-of address;

instructions for ascertaining from the registration request packet whether the router includes a Home Agent associated with the mobile node;

instructions for forwarding the registration request packet to the Home Agent, wherein the Home Agent is external to the router if it is ascertained from the registration request packet that the router does not include the Home Agent;

instructions for determining whether the care-of address specified in the registration request packet is equivalent to a Foreign Agent address associated with the router; and instructions for registering the mobile node visiting a Foreign Agent of the router with a Home Agent of the router if it is ascertained from the registration request packet that the router includes the Home Agent and it is determined that the care-of address specified in the registration request packet is equivalent to the Foreign Agent address associated with the router.

30. A router supporting Mobile IP adapted for registering a mobile node with a Home Agent via a Foreign Agent, comprising:

means for receiving a registration request packet, the registration request packet specifying a Home Address and a care-of address;

means for ascertaining from the registration request packet whether the router includes a Home Agent associated with the mobile node;

means for forwarding the registration request packet to the Home Agent, wherein the Home Agent is external to the router if it is ascertained from the registration request packet that the router does not include the Home Agent;

means for determining whether the care-of address specified in the registration request packet is equivalent to a Foreign Agent address associated with the router; and means for registering the mobile node visiting a Foreign Agent of the router with a Home Agent of the router if it is ascertained from the registration request packet that the router includes the Home Agent and it is determined that the care-of address specified in the registration request packet is equivalent to the Foreign Agent address associated with the router.

31. A router supporting Mobile IP adapted for registering a mobile node with a Home Agent via a Foreign Agent, the method comprising:

a processor; and a memory, at least one of the processor and the memory being adapted for:

receiving a registration request packet, the registration request packet specifying a Home Address and a care-of address;

ascertaining from the registration request packet whether the router includes a Home Agent associated with the mobile node;

if it is ascertained from the registration request packet that the router does not include the Home Agent, forwarding the registration request packet to the Home Agent, wherein the Home Agent is external to the router;

determining whether the care-of address specified in the registration request packet is equivalent to a Foreign Agent address associated with the router; and if it is ascertained from the registration request packet that the router includes the Home Agent and it is determined that the care-of address specified in the registration request packet is equivalent to the Foreign Agent address associated with the router, registering the mobile node visiting a Foreign Agent of the router with a Home Agent of the router.

* * * * *

UNITED STATES PATENT AND TRADEMARK OFFICE
CERTIFICATE OF CORRECTION

PATENT NO. : 6,621,810 B1
DATED : September 16, 2003
INVENTOR(S) : Leung

It is certified that error appears in the above-identified patent and that said Letters Patent is hereby corrected as shown below:

<u>Column 16,</u>
Lines 62 and 64, change "router" to -- method --.

Signed and Sealed this

Sixteenth Day of March, 2004

JON W. DUDAS
*Acting Director of the United States Patent and Trademark Office*